(12) United States Patent
Folberth et al.

(10) Patent No.: US 7,141,981 B2
(45) Date of Patent: Nov. 28, 2006

(54) ERROR CORRECTION AND CALIBRATION OF A DEEP READING PROPAGATION RESISTIVITY TOOL

(75) Inventors: Martin Folberth, Hannover (DE); Tsili Wang, Katy, TX (US)

(73) Assignee: Baker Hughes Incorporated, Houston, TX (US)

( * ) Notice: Subject to any disclaimer, the term of this patent is extended or adjusted under 35 U.S.C. 154(b) by 172 days.

(21) Appl. No.: 10/897,715

(22) Filed: Jul. 23, 2004

(65) Prior Publication Data

US 2006/0017442 A1    Jan. 26, 2006

(51) Int. Cl.
*G01V 3/18* (2006.01)
*G01V 3/28* (2006.01)
*G01V 3/38* (2006.01)

(52) U.S. Cl. ..................... 324/334; 324/339
(58) Field of Classification Search ........ 324/332–339, 324/323, 344
See application file for complete search history.

(56) References Cited

U.S. PATENT DOCUMENTS

| | | | |
|---|---|---|---|
| 4,427,941 A | 1/1984 | Riedesel, Jr. et al. ....... 324/323 |
| 5,001,675 A | 3/1991 | Woodward ................... 367/13 |
| 5,070,462 A | 12/1991 | Chau .......................... 364/460 |
| 5,260,661 A * | 11/1993 | Vail, III ...................... 324/339 |
| 5,293,128 A * | 3/1994 | Zhou .......................... 324/339 |
| RE35,386 E | 12/1996 | Wu et al. ..................... 175/45 |
| 5,869,968 A | 2/1999 | Brooks et al. .............. 324/338 |
| 6,218,842 B1 | 4/2001 | Bittar et al. ................. 324/339 |
| 6,646,441 B1 | 11/2003 | Thompson et al. ......... 324/338 |
| 2004/0217763 A1 | 11/2004 | Van Steenwyz et al. .... 324/338 |
| 2005/0030037 A1 | 2/2005 | Fanini et al. ............... 324/339 |
| 2005/0088180 A1* | 4/2005 | Flanagan .................... 324/338 |
| 2005/0189947 A1* | 9/2005 | Haugland ................... 324/338 |

OTHER PUBLICATIONS

J. B. Brami; *Current Calibration and Quality Control Practices for Selected Measurement-While-Drilling Tools*, SPE 22540, XP-002348764, Society of Petroleum Engineers, Oct. 8-9, 1991, pp. 49-64.

* cited by examiner

*Primary Examiner*—Edward Lefkowitz
*Assistant Examiner*—Kenneth J. Whittington
(74) *Attorney, Agent, or Firm*—Madan, Mossman & Sriram, P.C.

(57) ABSTRACT

A resistivity logging tool suitable for downhole use includes a transmitter, two spaced apart receivers. The measured resistivities at the two receivers are corrected for differences in receiver characteristics based on measuring the responses of the receivers to a calibration signal passed through calibration circuits. The logging tool may be used in reservoir navigation. A calibration antenna positioned between the two receivers may be used to identify factors other than the distance to a bed boundary that may effect the receiver signals.

34 Claims, 8 Drawing Sheets

ERROR CORRECTION AND CALIBRATION OF A DEEP READING PROPAGATION RESISTIVITY TOOL

BACKGROUND OF THE INVENTION

1. Field of the Invention

This invention relates generally to borehole formation evaluation instrumentation and methods of using such instrumentation in the drilling of directional wells. More particularly, this invention relates to a method for measuring the position of a drillstring while drilling a horizontal borehole and maintaining the drillstring within desired boundaries using electromagnetic propagation based earth formation evaluation tools.

2. Description of the Related Art

To obtain hydrocarbons such as oil and gas, well boreholes are drilled by rotating a drill bit attached at a drill string end. The drill string may be a jointed rotatable pipe or a coiled tube. Boreholes may be drilled vertically, but directional drilling systems are often used for drilling boreholes deviated from vertical and/or horizontal boreholes to increase the hydrocarbon production. Modern directional drilling systems generally employ a drill string having a bottomhole assembly (BHA) and a drill bit at an end thereof that is rotated by a drill motor (mud motor) and/or the drill string. A number of downhole devices placed in close proximity to the drill bit measure certain downhole operating parameters associated with the drill string. Such devices typically include sensors for measuring downhole temperature and pressure, tool azimuth, tool inclination. Also used are measuring devices such as a resistivity-measuring device to determine the presence of hydrocarbons and water. Additional downhole instruments, known as measurement-while-drilling (MWD) or logging-while-drilling (LWD) tools, are frequently attached to the drill string to determine formation geology and formation fluid conditions during the drilling operations.

Boreholes are usually drilled along predetermined paths and proceed through various formations. A drilling operator typically controls the surface-controlled drilling parameters during drilling operations. These parameters include weight on bit, drilling fluid flow through the drill pipe, drill string rotational speed (r.p.m. of the surface motor coupled to the drill pipe) and the density and viscosity of the drilling fluid. The downhole operating conditions continually change and the operator must react to such changes and adjust the surface-controlled parameters to properly control the drilling operations. For drilling a borehole in a virgin region, the operator typically relies on seismic survey plots, which provide a macro picture of the subsurface formations and a pre-planned borehole path. For drilling multiple boreholes in the same formation, the operator may also have information about the previously drilled boreholes in the same formation.

Figure 1:
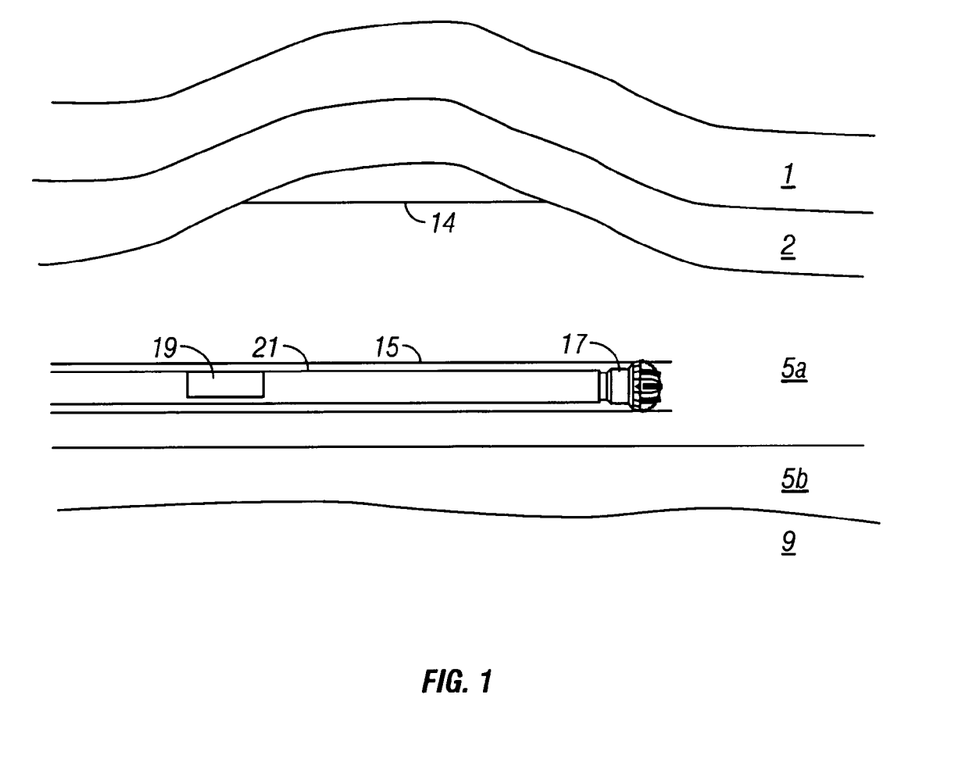
FIG. 1 is an illustration of a substantially horizontal borehole proximate to an oil/water contact in a reservoir.

In order to maximize the amount of recovered oil from such a borehole, the boreholes are commonly drilled in a substantially horizontal orientation in close proximity to the oil water contact, but still within the oil zone. U.S. Pat. No. RE35386 to Wu et al, having the same assignee as the present application and the contents of which are fully incorporated herein by reference, teaches a method for detecting and sensing boundaries in a formation during directional drilling so that the drilling operation can be adjusted to maintain the drillstring within a selected stratum is presented. The method comprises the initial drilling of an offset well from which resistivity of the formation with depth is determined. This resistivity information is then modeled to provide a modeled log indicative of the response of a resistivity tool within a selected stratum in a substantially horizontal direction. A directional (e.g., horizontal) well is thereafter drilled wherein resistivity is logged in real time and compared to that of the modeled horizontal resistivity to determine the location of the drill string and thereby the borehole in the substantially horizontal stratum. From this, the direction of drilling can be corrected or adjusted so that the borehole is maintained within the desired stratum. The configuration used in the Wu patent is schematically denoted in FIG. 1 by a borehole 15 having a drilling assembly 21 with a drill bit 17 for drilling the borehole. The resistivity sensor is denoted by 19 and typically comprises a transmitter and a plurality of sensors. Measurements may be made with propagation sensors that operate in the 400 kHz and higher frequency, typically 2 Mhz.

A limitation of the method and apparatus used by Wu is that resistivity sensors are responsive to oil/water contacts for relatively small distances, typically no more than 5 m; at larger distances, conventional propagation tools are not responsive to the resistivity contrast between water and oil. Wu discloses the use of a device in which a single transmitter is used and amplitude and phase measurements are made at two spaced apart receivers. U.S. Pat. No. 5,869,968 to Brooks et al. having the same assignee as the present invention discloses a dual propagation resistivity (DPR) tool in which a pair of transmitters are symmetrically disposed about a pair of receivers. With the arrangement in Brooks, it is possible to avoid the effect of mutually coupling between receivers in a propagation resistivity tool. However, even with the DPR device, it is difficult to get the necessary accuracy to see boundaries that are tens of meters from the borehole. It should be noted for the purposes of the present invention, the term boundaries includes boundaries between geologic formations as well as boundaries between different fluids in the subsurface.

Figure 2:
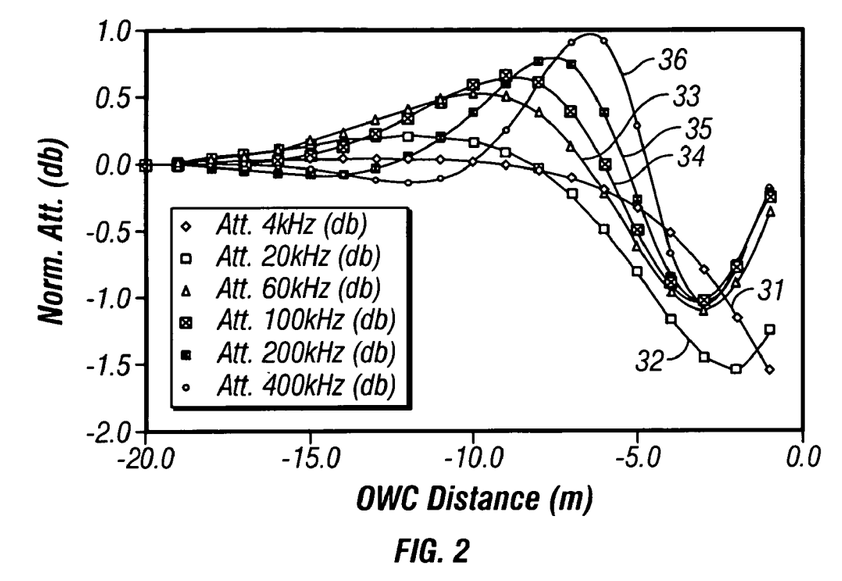
FIG. 2 shows simulation results for normalized amplitude ratios at two receivers for different distances from an oil water contact.
Figure 3:
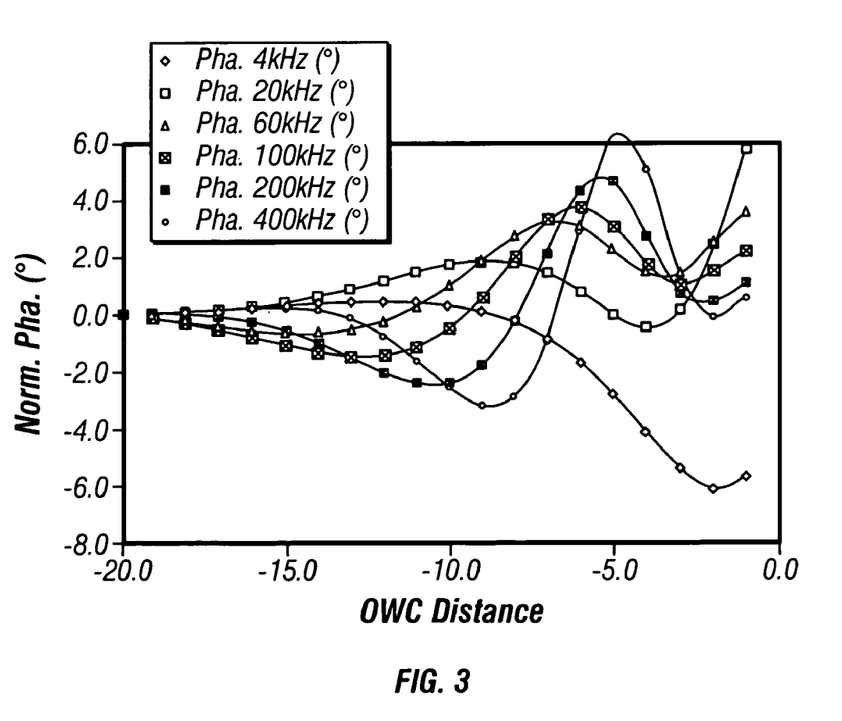
FIG. 3 shows simulation results for normalized phase difference at two receivers for different distances from an oil water contact.

An indication of the desired precision of measurements can be seen in FIGS. 2 and 3. Shown are simulations of amplitude (FIG. 2) and phase (FIG. 3) for a 3D model in which resistivity of the water-wet formation was taken as 0.2 $\Omega$m, the resistivity of the oil-wet formation was 20 $\Omega$m. The abscissa is the distance to the oil-water interface. Shown in FIG. 2 are amplitude ratios (in dB) for two receivers. The amplitude ratios have been normalized to amplitude ratios at a distance of 20 m, i.e., they are not absolute amplitude ratios. Similarly, FIG. 3 shows relative phase differences between measurements at the two receivers normalized to the phase difference at 20 m. The spacing between the two receivers for the model was 5 m. The spacing between the transmitter and the near receiver was 12 m.

In FIG. 2, curves 31, 32, 33, 34, 35 and 36 are the normalized amplitude ratios for frequencies of 4 kHz, 20 kHz, 60 kHz, 100 kHz, 200 kHz and 400 kHz respectively. In FIG. 3, curves 41, 42, 43, 44, 45 and 46 are the normalized phase differences for frequencies of 4 kHz, 20 kHz, 60 kHz, 100 kHz, 200 kHz and 400 kHz respectively. An important point to note is that at 400 kHz, both the amplitude ratios and the phase differences are relatively unresponsive at distances of less than 10 m. This is consistent with results shown in Wu.

The simulation results also show that even at lower frequencies, a high level of precision is required in the amplitude and phase measurements in order to use them as distance indicators. Such a precision has hitherto not been possible at lower frequency tools (less than about 400 kHz).

It would be desirable to have an apparatus and a method of using the apparatus that is able to identify bed boundaries at distances greater than 10 m for the purposes of reservoir navigation. Such an apparatus should have a high level of precision and be relatively simple to use. The present invention satisfies this need.

SUMMARY OF THE INVENTION

One embodiment of the present invention is an apparatus for measuring electromagnetic properties of an earth formation penetrated by a borehole and a method of using the apparatus. The apparatus includes a logging tool conveyed in the borehole. The logging tool has at least one transmitter, and two spaced apart receivers. The transmitter produces an electromagnetic field in the formation and the two receivers receive signals in response to the electromagnetic field. A calibration signal is selectively coupled through at least one calibration circuit to the first and second receivers. A downhole processor makes an estimate of the formation resistivity from the received signals using a receiver calibration resulting from the calibration signals. The calibration circuit(s) may be coupled to the receivers either through a transformer or as windings of antenna cores of the receivers. An additional transmitter may be positioned on the logging tool between the two receivers and received signals resulting from activation of the additional transmitter may be used for quality control. Optionally, a temperature sensor may be provided on the logging tool, and the resistivity calculations may be based on and the temperature measurements and stored data regarding temperature dependence of the calibration circuits.

The operating frequency of the calibration signal is sufficiently close to the operating frequency of the transmitter so that the calibration signal is representative of calibration of the receivers at the transmitter operating frequency. The criterion for closeness may be amplitude or phase of a transfer function at the frequencies of the transmitter and the calibration signal. The difference in frequencies makes it possible to operate the transmitter and the calibration source simultaneously. The resistivity measurements are based on amplitude ratios of signals at the two receivers and/or phase differences between the received signals. Measurements may be made with two different operating frequencies of the transmitter and processing may be done with a downhole processor. The logging tool may be conveyed on a wireline or be part of a bottomhole assembly used for drilling.

Another embodiment of the present invention is an apparatus for developing a hydrocarbon reservoir and a method of using the apparatus. The apparatus includes a logging tool conveyed in the borehole as part of a bottomhole assembly for drilling. The logging tool has at least one transmitter, and two spaced apart receivers. The transmitter produces an electromagnetic field in the formation and the two receivers receive signals in response to the electromagnetic field. Using a calibration circuit, the received signals are processed to give a high precision estimate of formation resistivity. In reservoir navigation, it is desired to maintain a drilling assembly at a desired distance from an interface (such as an oil-water contact). Using a model that may be based on measurements in a preexisting borehole, the resistivity estimates are used to estimate a distance to the interface. The direction of drilling is adjusted accordingly. Received signals resulting from an additional transmitter positioned between the two receivers are used as an indication of changes other than those due to the distance to the interface.

The calibration system includes a calibration source selectively coupled through at least one calibration circuit to the first and second receivers. The downhole processor uses the receiver responses to the calibration signal in the resistivity determination. The operating frequency of the calibration signal is sufficiently close to the operating frequency of the transmitter so that the calibration signal is representative of calibration of the receivers at the transmitter operating frequency. The criterion for closeness may be amplitude or phase of a transfer function at the frequencies of the transmitter and the calibration signal. The difference in frequencies makes it possible to operate the transmitter and the calibration source simultaneously. The resistivity measurements are based on amplitude ratios of signals at the two receivers and/or phase differences between the received signals. Measurements may be made with two different operating frequencies of the transmitter and processing may be done with a downhole processor.

BRIEF DESCRIPTION OF THE DRAWINGS

The present invention is best understood with reference to the accompanying figures in which like numerals refer to like elements, and in which.

DETAILED DESCRIPTION OF THE INVENTION

Figure 4:
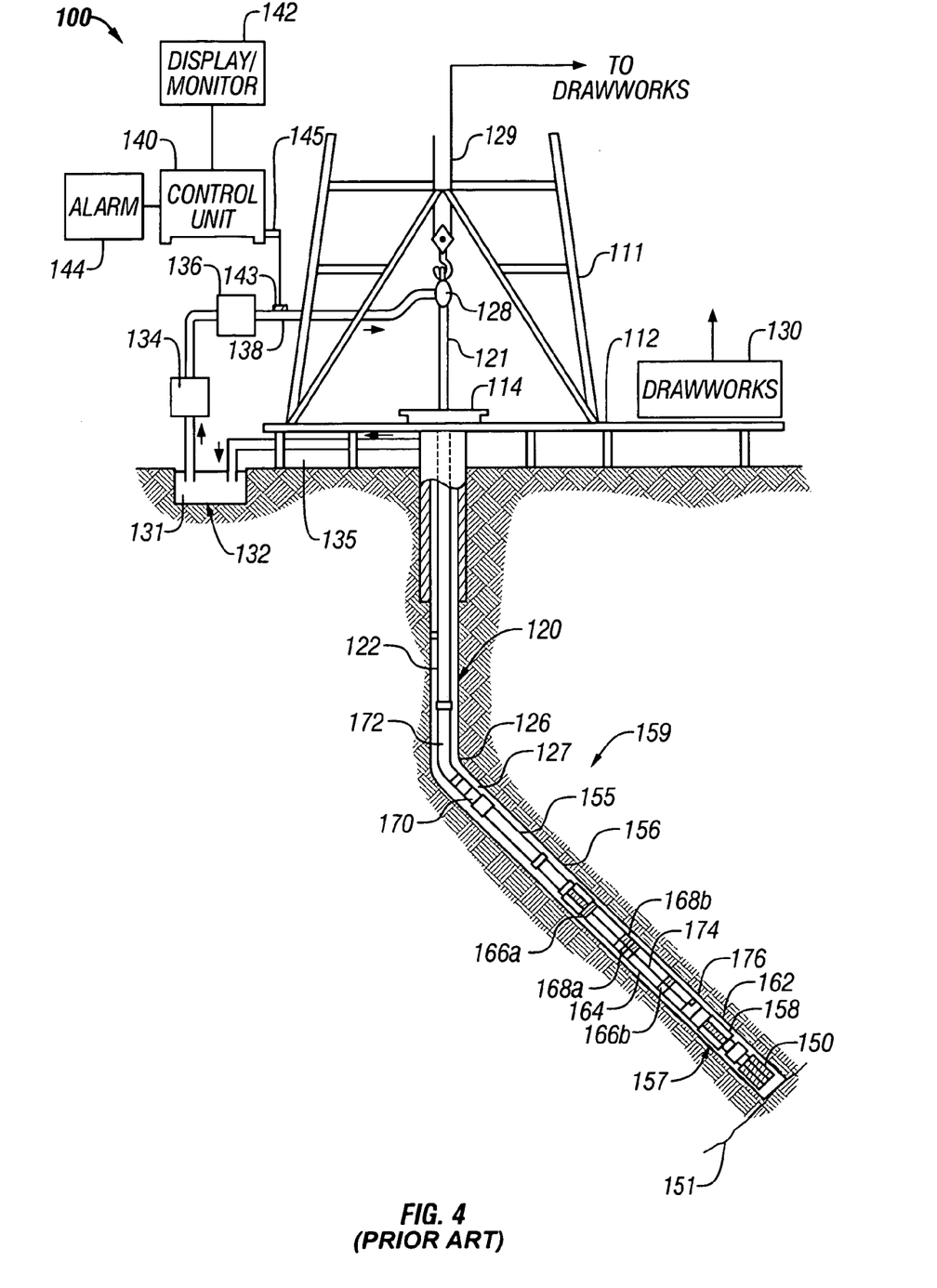
FIG. 4 (Prior Art) shows a logging-while-drilling tool suitable for use with the present invention.

FIG. 4 shows a schematic diagram of a drilling system 110 having a downhole assembly containing an acoustic sensor system and the surface devices according to one embodiment of present invention. As shown, the system 110 includes a conventional derrick 111 erected on a derrick floor 112 which supports a rotary table 114 that is rotated by a prime mover (not shown) at a desired rotational speed. A drill string 120 that includes a drill pipe section 122 extends downward from the rotary table 114 into a borehole 126. A drill bit 150 attached to the drill string downhole end disintegrates the geological formations when it is rotated. The drill string 120 is coupled to a drawworks 130 via a kelly joint 121, swivel 118 and line 129 through a system of pulleys 127. During the drilling operations, the drawworks 130 is operated to control the weight on bit and the rate of penetration of the drill string 120 into the borehole 126. The operation of the drawworks is well known in the art and is thus not described in detail herein.

During drilling operations a suitable drilling fluid (commonly referred to in the art as "mud") 131 from a mud pit 132 is circulated under pressure through the drill string 120 by a mud pump 134. The drilling fluid 131 passes from the mud pump 134 into the drill string 120 via a desurger 136, fluid line 138 and the kelly joint 121. The drilling fluid is discharged at the borehole bottom 151 through an opening in the drill bit 150. The drilling fluid circulates uphole through the annular space 127 between the drill string 120 and the borehole 126 and is discharged into the mud pit 132 via a return line 135. Preferably, a variety of sensors (not shown) are appropriately deployed on the surface according to known methods in the art to provide information about various drilling-related parameters, such as fluid flow rate, weight on bit, hook load, etc.

A surface control unit 140 receives signals from the downhole sensors and devices via a sensor 143 placed in the fluid line 138 and processes such signals according to programmed instructions provided to the surface control unit. The surface control unit displays desired drilling parameters and other information on a display/monitor 142 which information is utilized by an operator to control the drilling operations. The surface control unit 140 contains a computer, memory for storing data, data recorder and other peripherals. The surface control unit 140 also includes models and processes data according to programmed instructions and responds to user commands entered through a suitable means, such as a keyboard. The control unit 140 is preferably adapted to activate alarms 144 when certain unsafe or undesirable operating conditions occur.

A drill motor or mud motor 155 coupled to the drill bit 150 via a drive shaft (not shown) disposed in a bearing assembly 157 rotates the drill bit 150 when the drilling fluid 131 is passed through the mud motor 155 under pressure. The bearing assembly 157 supports the radial and axial forces of the drill bit, the downthrust of the drill motor and the reactive upward loading from the applied weight on bit. A stabilizer 158 coupled to the bearing assembly 157 acts as a centralizer for the lowermost portion of the mud motor assembly. The use of a motor is for illustrative purposes and is not a limitation to the scope of the invention.

In one embodiment of the system of present invention, the downhole subassembly 159 (also referred to as the bottomhole assembly or "BHA") which contains the various sensors and MWD devices to provide information about the formation and downhole drilling parameters and the mud motor, is coupled between the drill bit 150 and the drill pipe 122. The downhole assembly 159 preferably is modular in construction, in that the various devices are interconnected sections so that the individual sections may be replaced when desired.

Still referring to FIG. 4, the BHA also preferably contains sensors and devices in addition to the above-described sensors. Such devices include a device for measuring the formation resistivity near and/or in front of the drill bit, a gamma ray device for measuring the formation gamma ray intensity and devices for determining the inclination and azimuth of the drill string. The formation resistivity measuring device 164 is preferably coupled above the lower kick-off subassembly 162 that provides signals, from which resistivity of the formation near the drill bit 150 is determined. A multiple propagation resistivity device ("MPR") having one or more pairs of transmitting antennae 166a and 166b spaced from one or more pairs of receiving antennae 168a and 168b is used. Magnetic dipoles are employed which operate in the medium frequency and lower high frequency spectrum. In operation, the transmitted electromagnetic waves are perturbed as they propagate through the formation surrounding the resistivity device 164. The receiving antennae 168a and 168b detect the perturbed waves. Formation resistivity is derived from the phase and amplitude of the detected signals. The detected signals are processed by a downhole circuit or processor that is preferably placed in a housing 170 above the mud motor 155 and transmitted to the surface control unit 140 using a suitable telemetry system 172. In addition to or instead of the propagation resistivity device, a suitable induction logging device may be used to measure formation resistivity.

The inclinometer 174 and gamma ray device 176 are suitably placed along the resistivity measuring device 164 for respectively determining the inclination of the portion of the drill string near the drill bit 150 and the formation gamma ray intensity. Any suitable inclinometer and gamma ray device, however, may be utilized for the purposes of this invention. In addition, an azimuth device (not shown), such as a magnetometer or a gyroscopic device, may be utilized to determine the drill string azimuth. Such devices are known in the art and are, thus, not described in detail herein. In the above-described configuration, the mud motor 155 transfers power to the drill bit 150 via one or more hollow shafts that run through the resistivity measuring device 164. The hollow shaft enables the drilling fluid to pass from the mud motor 155 to the drill bit 150. In an alternate embodiment of the drill string 120, the mud motor 155 may be coupled below resistivity measuring device 164 or at any other suitable place.

The drill string contains a modular sensor assembly, a motor assembly and kick-off subs. In one embodiment, the sensor assembly includes a resistivity device, gamma ray device and inclinometer, all of which are in a common housing between the drill bit and the mud motor. The downhole assembly of the present invention preferably includes a MWD section 168 which contains a nuclear formation porosity measuring device, a nuclear density device, an acoustic sensor system placed, and a formation testing system above the mud motor 164 in the housing 178 for providing information useful for evaluating and testing subsurface formations along borehole 126. A downhole processor may be used for processing the data.

Figure 5:
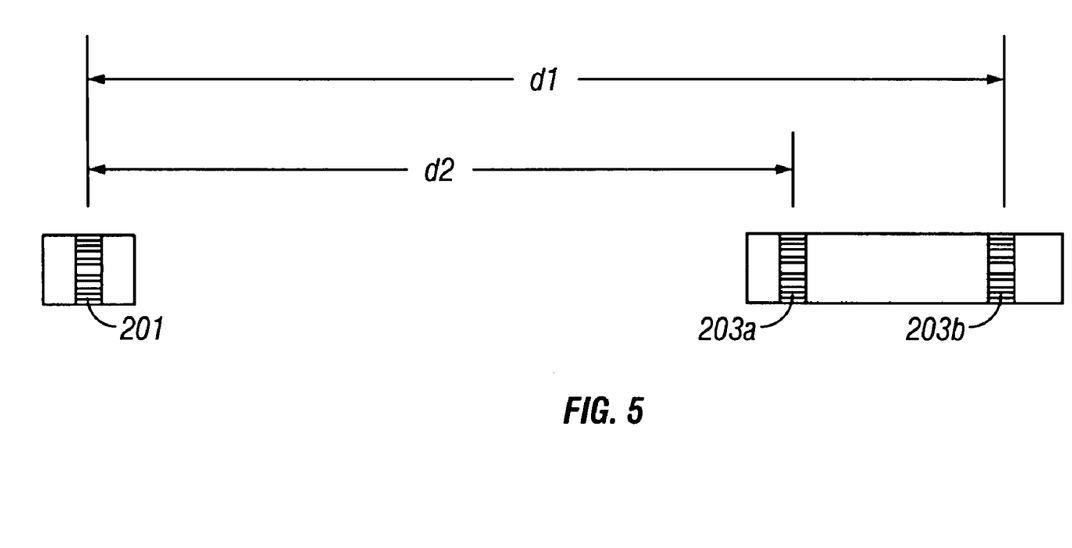
FIG. 5 shows the transmitter-receiver configuration.

The arrangement of the transmitter 201 and the receivers 203a, 203b is as indicated in FIG. 5. The transmitter is at a distance d1 from the far receiver and a distance d2 from the near receiver. In one embodiment of the invention, the distances d1 and d2 are 17 m and 12 m respectively. One of the novel features of the present invention is the calibration of the receivers to provide the necessary precision of resistivity measurements. This is discussed next.

Figure 6:
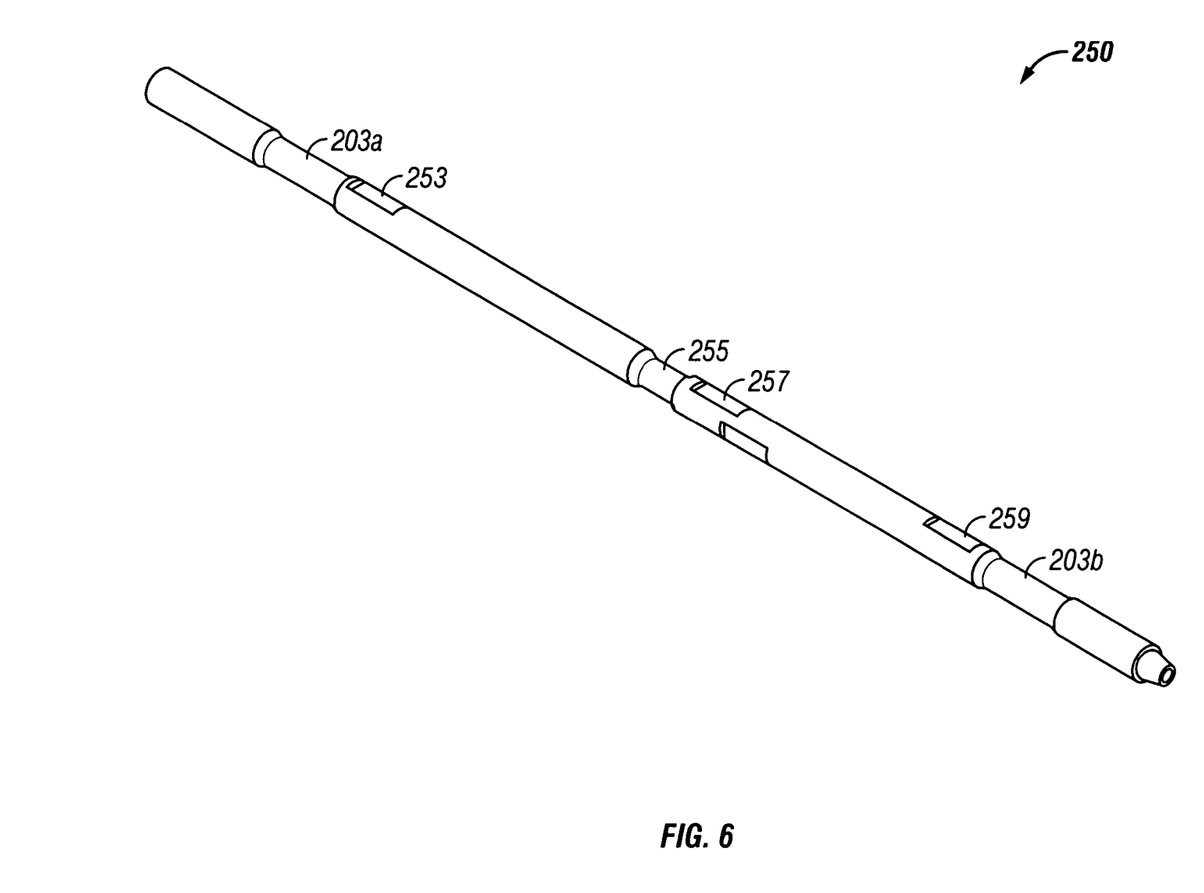
FIG. 6 is a view of the resistivity sub of the present invention.

Turning now to FIG. 6, the receiver sub is generally indicated by 250. Included in the receiver sub is a first receiver antenna, designated by 203a, and the corresponding receiver electronics, denoted by 253. The second receiver antenna and the corresponding receiver electronics are denoted by 203b and 259 respectively. An additional calibration antenna 257 may be provided, along with electronics in the center section 255.

In one embodiment of the invention, magnetic fields are generated in the transmitter 201 at 2 measurement frequencies. The two frequencies may be 20 kHz and 50 kHz respectively. As a result of the transmitter excitation, eddy currents are generated in the formation. These eddy currents in turn induce electrical voltages and currents in the receiver coils. The magnitude and phase relationships between the receiver voltages at the individual frequencies are dependent on a number of parameters. These include (i) the distance to the oil-water contact (OWC distance), (ii) the mud resistivity, (iii) the resistivity of the oil bearing formation, (iv) the resistivity of the water bearing formation, (v) the borehole diameter, and, (vi) the transmitter-receiver spacing. If the last five parameters are kept relatively constant or are known, the primary source of change—albeit very small—will be the OWC distance, which is the quantity used in reservoir navigation.

It is well known that the transmitter and receiver electronics can be quite sensitive to temperature variations, particularly in the borehole environment. There may be slight variations in the temperature sensitivity of the two receivers, the variations being sufficient to dominate the changes in receiver signals caused by changes in the distance to the oil-water contact. For this reason, it is important to have proper calibration of the receivers. Two approaches may be used in the present invention to achieve this calibration.

Figure 7:
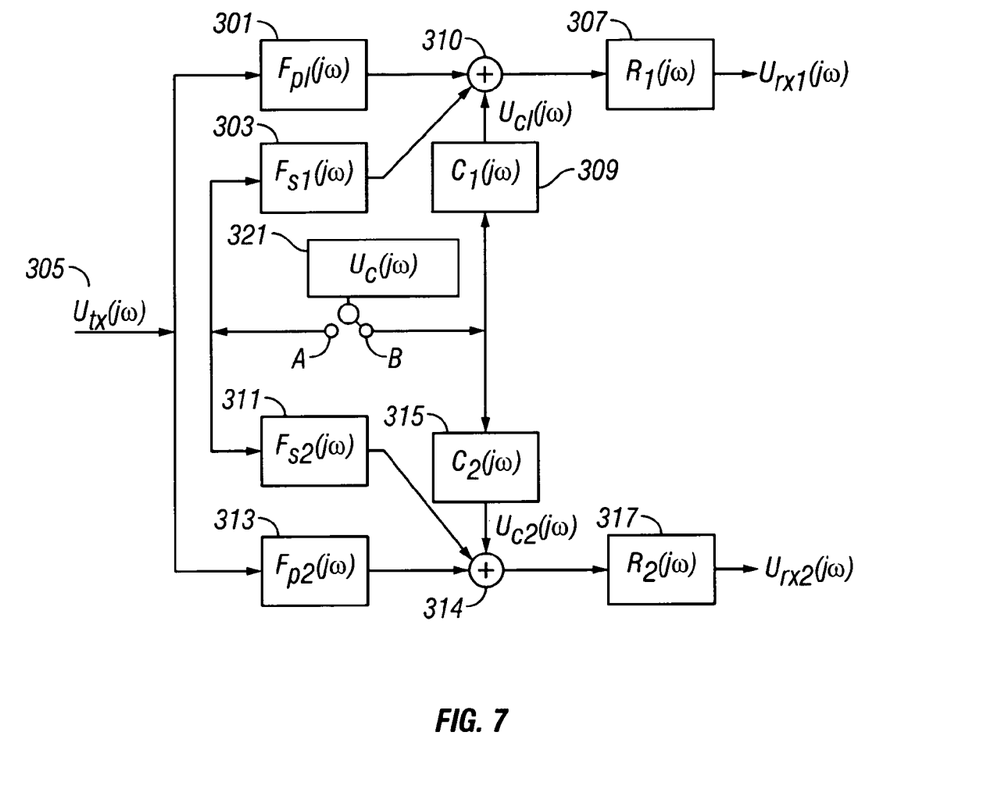
FIG. 7 is a block diagram showing the various components of the resistivity sensor system and associated transfer functions.

The process is schematically illustrated in FIG. 7. 305 where the spectrum $U_{tx}(j\omega)$ denotes the transmitter output in the frequency domain $\omega$. The transfer function $F_{p1}(\omega)$ 301 is used to characterize the formation from the transmitter antenna to the first receiver antenna while transfer function $F_{p2}(\omega)$ 313 is used to characterize the formation from the transmitter antenna to the second receiver antenna. We further denote by $R_1(j\omega)$ 307 and $R_2(j\omega)$ 317 the transfer functions of the two receivers. Then the outputs of the two receivers $U_{rx1}(j\omega)$ and $U_{rx1}(j\omega)$, which may be called the primary measurements, in response to a transmitter excitation $U_{tx}(j\omega)$ are given by:

$$U_{rx1}(j\omega) = F_{p1}(j\omega) \times R_1(j\omega) \times U_{tx}(j\omega) \qquad (1)$$

and $$U_{rx2}(j\omega) = F_{p2}(j\omega) \times R_2(j\omega) \times U_{tx}(j\omega) \qquad (2)$$

respectively.

The ratio of the two receiver outputs is $$A_{mp}(j\omega) = \frac{U_{rx2}(j\omega)}{U_{rx1}(j\omega)} = \frac{F_{p2}(j\omega) \times R_2(j\omega)}{F_{p1}(j\omega) \times R_1(j\omega)}. \qquad (3)$$

For the case in which the two receiver transfer functions are identical, i.e., for $$R_1(j\omega) = R_2(j\omega) \qquad (4)$$

eqn. (3), gives the desired differential formation property between the two receivers, i.e., $$A_{mp}(j\omega) = A_{fp}(j\omega) = \frac{F_{p2}(j\omega)}{F_{p1}(j\omega)}. \qquad (5)$$

In reality, eqn. (4) is not necessarily satisfied, and, in most situations, the difference between the two receiver transfer functions is sufficiently large that the differential formation property between the two receivers is not given by eqn. (3). The relative calibration is determined in the present invention by use of calibration circuits 309 and 315 having known calibration transfer functions $C_1(j\omega)$ and $C_2(j\omega)$ respectively. The circuits represented by $C_1(j\omega)$ and $C_2(j\omega)$ may be coaxial cables between the calibration source and the corresponding receiver input. In one embodiment of the invention, transformers (depicted by 310, 314) may be used for coupling the coaxial cables to the corresponding receiver. In an alternate embodiment of the invention, the coaxial cable may be connected to a secondary winding on the core (not shown) of the receiver antenna.

Specifically, a signal from a calibration source 321 having a spectrum $U_c(j\omega)$ is sent to calibration circuits 309 and 315, i.e., with the source connected to switching position B. The respective receiver outputs in response to the calibration signal are given by $$U_{rx1}(j\omega) = C_1(j\omega) \times R_1(j\omega) \times U_c(j\omega) \qquad (6)$$

and $$U_{rx2}(j\omega) = C_2(j\omega) \times R_2(j\omega) \times U_c(j\omega) \qquad (7)$$

respectively.

The calibration measurement transfer function is defined as the ratio $A_c(j\omega)$ of the receiver outputs in response to the calibration signal $$A_c(j\omega) = \frac{U_{rx2}(j\omega)}{U_{rx1}(j\omega)} = \frac{C_2(j\omega) \times R_2(j\omega)}{C_1(j\omega) \times R_1(j\omega)} \qquad (8)$$

which gives the desired receiver calibration as $$\frac{R_1(j\omega)}{R_2(j\omega)} = \frac{C_2(j\omega)}{C_1(j\omega)} \times \frac{1}{A_c(j\omega)}. \qquad (9)$$

Since $$A_{fp}(j\omega) = A_{mp}(j\omega) \times \frac{R_1(j\omega)}{R_2(j\omega)},$$

this gives the result $$A_{fp}(j\omega) = \frac{A_{mp}(j\omega)}{A_c(j\omega)} \times \frac{C_2(j\omega)}{C_1(j\omega)}. \qquad (10)$$

This may be simplified as $$A_{fp}(j\omega) = \frac{A_{mp}(j\omega) \times C_c(j\omega)}{A_c(j\omega)} \qquad (11)$$

where $$C_c(j\omega) = \frac{U_{c2}(j\omega)}{U_{c1}(j\omega)} = \frac{C_2(j\omega)}{C_1(j\omega)} \qquad (12)$$

is a combined calibration transfer function. Thus, if the combined calibration transfer function is known, then the desired formation property is determined from the measured receiver signals and the combined calibration transfer function.

In operation, two separate calibration networks are used and the combined calibration transfer function $C_c(j\omega)$ is determined over a range of temperatures. The calibration transfer function is stored in a table in downhole memory along with the corresponding temperature. A downhole temperature sensor measures the operating temperature of the receiver sub and the stored calibration transfer function corresponding to the measured temperature is used for processing the receiver signals. In the present invention, these processed resistivities are used for reservoir navigation as discussed below.

In an alternate embodiment of the invention, the measured amplitude ratios, phase differences and temperature are telemetered to the surface where the correct resistivity is determined. The reservoir navigation may then be done using a surface processor with human involvement.

In operation, the calibration circuit may be switched to connect to an additional antenna referred to as a calibration antenna 255. Under these conditions, $$A_{fs}(j\omega) = \frac{A_{ms}(j\omega) \times C_c(j\omega)}{A_c(j\omega)}. \quad (13)$$

Since the calibration antenna is positioned between the two receiver antennas, $A_{fs}(j\omega)$ should not be responsive to the distance to the OWC. Any changes in $A_{fs}(j\omega)$ are thus indicative of possible changes in something other than the distance to the OWC. These other factors could include changes in borehole diameter and changes in earth resistivity. The measurements made by the calibration antenna thus serve as quality control for the primary measurements.

To reduce the acquisition time and/or to maintain spatial resolution of the measurements, it is desirable to make the primary measurements, the calibration measurements and the secondary measurements simultaneously. For this reason, the calibration measurements are made at a frequency slightly different from each of the frequencies for the primary measurements. For example, if the primary frequency is denoted by f (corresponding to an angular frequency $\omega=2\pi f$), then the following constraints are imposed:

$$\left|\frac{C_c(j\omega)}{C_c(j(\omega+\delta\omega))}\right| < 0.1 \text{ dB} \quad (14)$$
$$|Ang\{C_c(j\omega) - C_c(j(\omega+\delta\omega))\}| < 0.01°.$$

The limits of 0.1 dB and 0.01° are selected on the basis of the required accuracy for determination of the distance to the OWC. An additional consideration is that the clocks controlling the oscillators are frequencies f and f+δf be stable. In order to meet the stability requirements, a downhole atomic clock such as that described in U.S. patent application Ser. No. 10/664,664 of DiFoggio et al. filed on Sep. 18, 2003 and the contents of which are incorporated herein by reference, may be used.

Figure 8A:
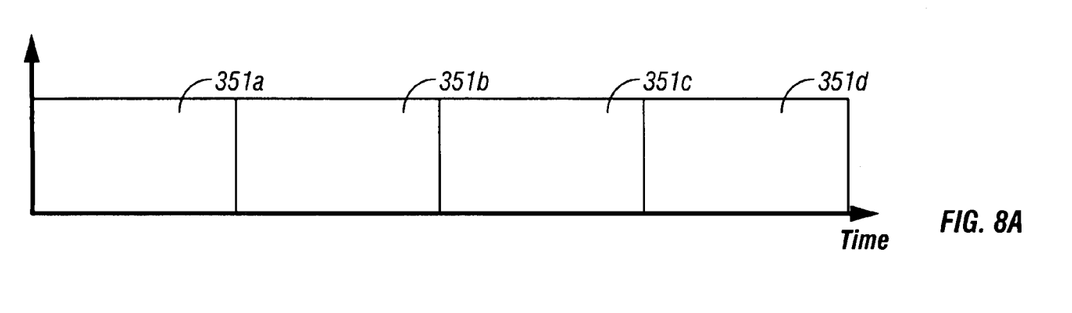
FIGS. 8a–c illustrate an example of the interleaving of the primary resistivity measurements with calibration measurements and secondary measurements.
Figure 8B:
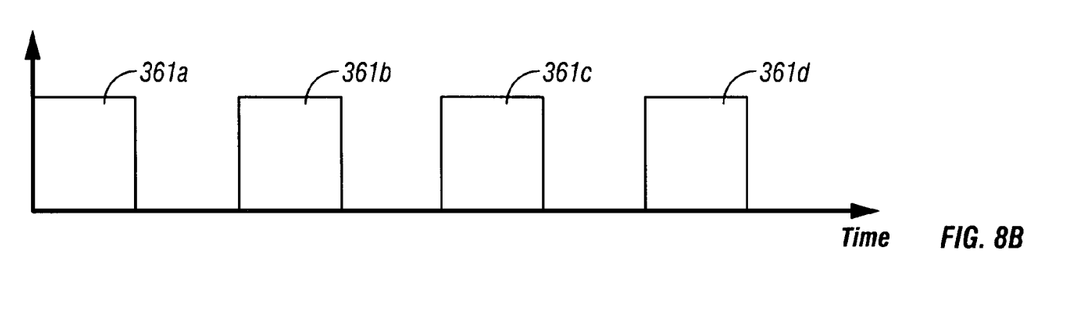
Figure 8C:
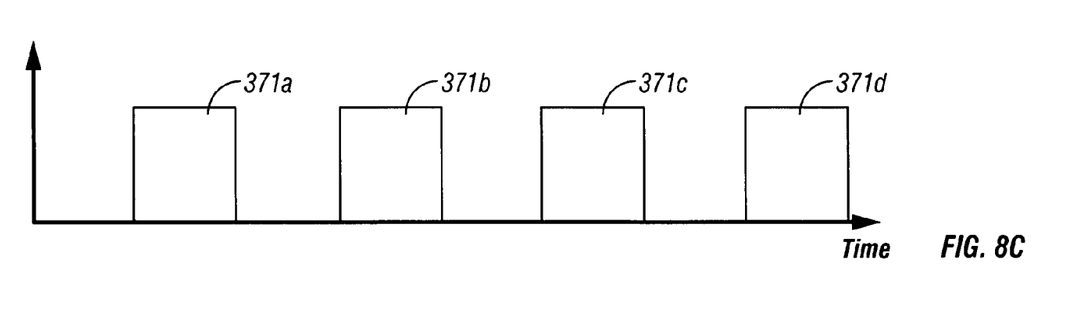

In order to meet the requirements for simultaneous acquisition of the primary, secondary and calibration measurements, the primary measurements are made substantially continuously while the secondary and calibration measurements have suitable time slots allocated. This is schematically illustrated in FIG. 8a where the resistivity measurements are denoted by 351a, 351b, 351c, 351d, 351e while the calibration measurements (FIG. 8b) denoted by 361a, 361b, 361c, 361d are interleaved with the secondary measurements 371a, 371b, 371c, 371d (FIG. 8d).

Figure 9:
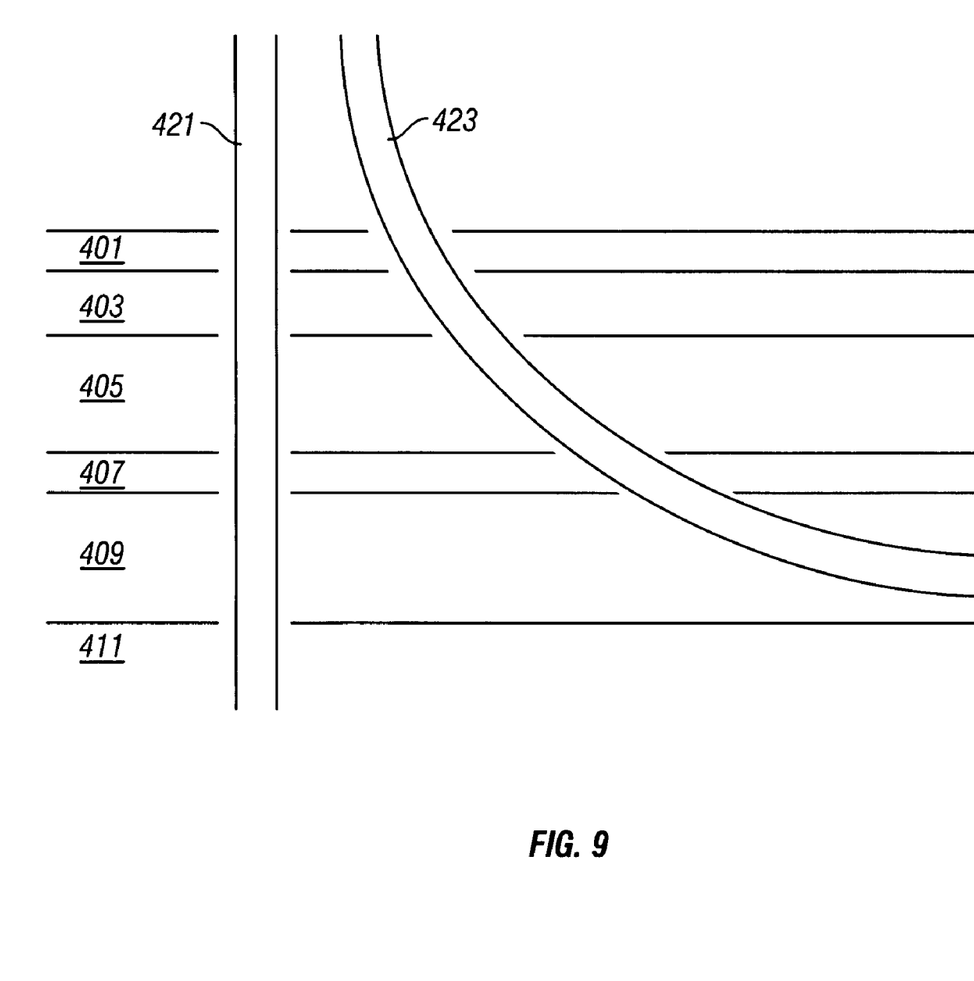
FIG. 9 shows use of the apparatus in a deviated borehole for reservoir navigation.

As discussed in Wu, an initial resistivity model is obtained for the geologic interval of interest. This may be done by logging a vertical or near vertical well in the vicinity of where the horizontal well is to be drilled. This is illustrated in FIG. 9 where layers 401, 403, 405, 407, 409, and 411 are shown. 409 may be oil saturated reservoir rock while 411 may be water saturated. An initial well 421 is shown and resistivity measurements made in the initial well are used for modeling and reservoir navigation of the later well 423. The objective is to maintain the horizontal well at a specified distance from the OWC between 409 and 411. An additional objective may be to maintain the horizontal well within the layer 409 and avoid the caprock 407. Using the apparatus described above, resistivity values (amplitude ratios and phase differences) can be monitored while drilling and, based on model values, a distance to a boundary can be determined.

In a significant number of reservoirs, due to hydrodynamic effects, the OWC may not be horizontal. In such a case, the continuous monitoring of the distance is necessary and simply maintaining the borehole at a fixed depth (determinable from gyro measurements) will not be adequate.

In practice, it has been found that the calibration circuits $C_1(j\omega)$ and $C_2(j\omega)$ (and in particular, their ratio) may have little temperature variation. While it is necessary to know the absolute value of their ratio for determination of resistivity, such is not the case for reservoir navigation where stability of the ratio is sufficient. We note that FIGS. 2–3 show relative changes in resistivity as a function of distance from the OWC. Precision of the measurements (i.e., repeatability) within the limits noted in eqn. (14) is sufficient and the absolute accuracy of the resistivity measurements is not critical. In one embodiment of the invention, the ratio is established once and an assumption of stability is made. Under this assumption, temperature monitoring and correction is not required.

While the foregoing disclosure is directed to the preferred embodiments of the invention, various modifications will be apparent to those skilled in the art. It is intended that all such variations within the scope of the appended claims be embraced by the foregoing disclosure.

What is claimed is:

1. An apparatus for measuring electromagnetic properties of an earth formation penetrated by a borehole comprising:
   (a) a logging tool conveyed in said borehole, said logging tool including at least one transmitter which produces a first electromagnetic field having a first frequency in said earth formation;
   (b) a first receiver on said logging tool which produces a first signal in response to said first electromagnetic field and a second receiver spaced apart from said first receiver producing a second signal in response to said first electromagnetic field;
   (c) a device which selectively couples a calibration source having a second frequency different from the first frequency on said logging tool to said first and second receivers through at least one calibration circuit and produces third and fourth signals from said receivers; and
   (d) a processor which determines from said first, second, third and fourth signals an estimate of a resistivity of said formation.

2. The apparatus of claim 1 wherein said at least one calibration circuit includes a transformer.

3. The apparatus of claim 1 wherein said at least one calibration circuit is coupled to a core of an antenna of at least one of said first and second receivers.

4. The apparatus of claim 1 wherein said at least one calibration circuit comprises first and second calibration circuits associated with said first and second receivers respectively.

5. The apparatus of claim 1 further comprising an additional transmitter positioned between said first and second receivers which produces a second electromagnetic field in said earth formation, said additional transmitter being selectively coupled to said calibration source by said device.

6. The apparatus of claim 1 further comprising a temperature sensor which produces a measurement indicative of a temperature of said logging tool and wherein said processor further uses said temperature measurement for said estimation of said resistivity.

7. The apparatus of claim 5 further comprising a memory device having stored calibration data corresponding to said at least one calibration circuit, and wherein said processor further uses said stored calibration data for said estimation of said resistivity.

8. The apparatus of claim 1 wherein a characteristic of the at least one calibration circuit at said first and second frequencies satisfies a specified constraint.

9. The apparatus of claim 8 wherein said characteristic comprises $$\left|\frac{C_c(j\omega)}{C_c(j(\omega+\delta\omega))}\right|$$

where $\omega$ is said first frequency, $\omega+\delta\omega$ is said second frequency, where $C_c$ is a transfer function associated with said at least one calibration circuit.

10. The apparatus of claim 8 wherein said characteristic comprises $$|\text{Ang}\{C_c(j\omega)-C_c(j(\omega=\delta\omega))\}|$$

where $\omega$ is said first frequency, $\omega+\delta\omega$ is said second frequency, where $C_c$ is a transfer function associated with said at least one calibration circuit.

11. The apparatus of claim 8 wherein said calibration source is coupled to said first and second receivers simultaneously with said production of said first electromagnetic field by said transmitter.

12. The apparatus of claim 8 further comprising an additional transmitter positioned between said first and second receivers which produces a second electromagnetic field in said earth formation, said additional transmitter being selectively coupled to said calibration source by said device.

13. The apparatus of claim 12 wherein said calibration source is coupled to said additional transmitter simultaneously with said production of said first electromagnetic field by said transmitter.

14. The apparatus of claim 1 wherein said processor estimates said resistivity in part by using an amplitude ratio of said first and second signals.

15. The apparatus of claim 1 wherein said processor estimates said resistivity at least by using a phase difference between said first and second signals.

16. The apparatus of claim 1 wherein said processor is at a downhole location.

17. The apparatus of claim 8 wherein said first frequency is less than 100 kHz.

18. The apparatus of claim 1 wherein said logging tool is conveyed on a wireline into said borehole.

19. The apparatus of claim 1 wherein said logging tool is part of a bottomhole assembly conveyed in said borehole.

20. A method of measuring electromagnetic properties of an earth formation penetrated by a borehole comprising:

(a) conveying a logging tool into said borehole, (b) activating a transmitter on said logging tool and producing a first electromagnetic field at a first frequency in said earth formation;

(c) producing from measurements by first and second receivers at two spaced apart positions on said logging tool fist and second signals responsive to said first electromagnetic field;

(d) coupling a calibration source operating at a second frequency different from the first frequency on said logging tool to said first and second receivers through at least one calibration circuit and producing third and fourth signals from said receivers; and (e) determining from said first, second, third and fourth signals an estimate of a resistivity of said formation.

21. The method of claim 20 wherein said at least one calibration circuit comprises first and second calibration circuits associated with said first and second receivers.

22. The method of claim 20 further comprising:

(i) using an additional transmitter coupled to said calibration source and positioned between said first and second receivers for producing a second electromagnetic field in said earth formation, (ii) producing fifth and sixth signals at said first and second receivers responsive to said second electromagnetic field; and (iii) using said fifth and sixth signals as an indication of a change in said electromagnetic properties proximate to said borehole.

23. The method of claim 20 further comprising using a measurement of a temperature of said logging tool for estimating said resistivity.

24. The method of claim 23 wherein using said temperature measurement further comprises using stored temperature calibration data relating to said at least one calibration circuit.

25. The method of claim 20
wherein a characteristic of said at least one calibration circuit at said first and second frequencies satisfies a specified constraint.

26. The method of claim 25 wherein said characteristic comprises $$\left|\frac{C_c(j\omega)}{C_c(j(\omega+\delta\omega))}\right|$$

where $\omega$ is said first frequency, $\omega+\delta\omega$ is said second frequency, where $C_c$ is a transfer function associated with said at least one calibration circuit.

27. The method of claim 25 wherein said characteristic comprises $$|\text{Ang}\{C_c(j\omega)-C_c(j(\omega=\delta\omega))\}|$$

where $\omega$ is said first frequency, $\omega+\delta\omega$ is said second frequency, where $C_c$ is a transfer function associated with said at least one calibration circuit.

28. The method of claim 22 further comprising coupling said calibration source to said first and second receivers simultaneously with said activation of said transmitter.

29. The method of claim 25 further comprising:

(i) positioning an additional transmitter between said first and second receivers, (ii) selectively coupling said additional transmitter to said calibration source and producing a second electromagnetic field in said earth formation, (iii) producing fifth and sixth signals from said first and second receivers responsive to said second electromagnetic field, and (iv) using said fifth and sixth signals in said resistivity estimation.

30. The method of claim 29 wherein said calibration source is coupled to said additional transmitter simulta neously with said production of said first electromagnetic field by said transmitter.

31. The method of claim 20 wherein determining said estimate of said resistivity further comprises using an amplitude ratio of said first and second signals.

32. The method of claim 20 wherein determining said resistivity further comprises using a phase difference between said first and second signals.

33. The method of claim 21 wherein said determining of said resistivity further comprises using a processor on said BHA.

34. The method of claim 25 wherein said first frequency is less than 100 kHz.

* * * * *